United States Patent
Li

(10) Patent No.: US 8,591,763 B2
(45) Date of Patent: *Nov. 26, 2013

(54) HALIDE ANIONS FOR METAL REMOVAL RATE CONTROL

(75) Inventor: Shoutian Li, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 1075 days.

This patent is subject to a terminal disclaimer.

(21) Appl. No.: 11/960,135

(22) Filed: Dec. 19, 2007

(65) Prior Publication Data

US 2008/0096390 A1   Apr. 24, 2008

Related U.S. Application Data

(63) Continuation-in-part of application No. 11/388,085, filed on Mar. 23, 2006, now Pat. No. 7,820,067.

(51) Int. Cl.
*C09K 13/00* (2006.01)
*C23F 1/00* (2006.01)

(52) U.S. Cl.
USPC ............ 252/79.1; 252/79.2; 51/307; 106/3; 216/88; 216/89; 438/692; 438/693

(58) Field of Classification Search
USPC ........... 252/79.1; 51/307; 106/3; 216/88, 89; 438/692, 693
See application file for complete search history.

(56) References Cited

U.S. PATENT DOCUMENTS

| | | | |
|---|---|---|---|
| 5,196,353 A | 3/1993 | Sandhu et al. | |
| 5,378,251 A * | 1/1995 | Culler et al. | 51/295 |
| 5,433,651 A | 7/1995 | Lustig et al. | |
| 5,609,511 A | 3/1997 | Moriyama et al. | |
| 5,643,046 A | 7/1997 | Katakabe et al. | |
| 5,658,183 A | 8/1997 | Sandhu et al. | |
| 5,730,642 A | 3/1998 | Sandhu et al. | |
| 5,838,447 A | 11/1998 | Hiyama et al. | |
| 5,872,633 A | 2/1999 | Holzapfel et al. | |
| 5,893,796 A | 4/1999 | Birang et al. | |
| 5,904,159 A * | 5/1999 | Kato et al. | 134/7 |
| 5,916,855 A * | 6/1999 | Avanzino et al. | 51/307 |
| 5,949,927 A | 9/1999 | Tang | |
| 5,964,643 A | 10/1999 | Birang et al. | |
| 6,294,027 B1 | 9/2001 | Li et al. | |
| 6,294,072 B1 | 9/2001 | Fairbourn | |
| 6,315,803 B1 | 11/2001 | Ina et al. | |
| 6,316,366 B1 | 11/2001 | Kaufman et al. | |
| 6,362,104 B1 | 3/2002 | Wang et al. | |
| 6,435,947 B2 | 8/2002 | Mueller et al. | |
| 6,447,563 B1 | 9/2002 | Mahulikar | |
| 6,582,761 B1 | 6/2003 | Nishimoto et al. | |
| 6,635,186 B1 | 10/2003 | Small et al. | |
| 6,641,630 B1 | 11/2003 | Sun | |
| 6,719,920 B2 | 4/2004 | Miller | |
| 6,783,432 B2 | 8/2004 | Li et al. | |
| 6,812,193 B2 | 11/2004 | Brigham et al. | |
| 6,821,309 B2 | 11/2004 | Singh et al. | |
| 6,852,631 B2 | 2/2005 | Miller | |
| 7,316,603 B2 | 1/2008 | Carter et al. | |
| 2002/0104269 A1 | 8/2002 | Sun et al. | |
| 2002/0132560 A1 * | 9/2002 | Luo et al. | 451/36 |
| 2003/0017785 A1 | 1/2003 | Ueda et al. | |
| 2003/0168627 A1 | 9/2003 | Singh et al. | |
| 2003/0194868 A1 | 10/2003 | Miller | |
| 2004/0082274 A1 * | 4/2004 | Leng | 451/41 |
| 2004/0115944 A1 * | 6/2004 | Matsui | 438/692 |
| 2005/0026444 A1 * | 2/2005 | Babu et al. | 438/697 |
| 2005/0097825 A1 | 5/2005 | Bian | |
| 2005/0104048 A1 * | 5/2005 | Thomas et al. | 252/515 |
| 2005/0153643 A1 * | 7/2005 | Simpson et al. | 451/526 |
| 2006/0030158 A1 | 2/2006 | Carter et al. | |
| 2007/0224822 A1 | 9/2007 | Li | |

* cited by examiner

*Primary Examiner* — Shamim Ahmed
(74) *Attorney, Agent, or Firm* — Thomas E. Omholt; Francis J. Koszyk; Steven D. Weseman

(57) ABSTRACT

The inventive chemical-mechanical polishing composition comprises a liquid carrier, hydrogen peroxide, benzotriazole, and a halogen anion. The inventive method comprises chemically-mechanically polishing a substrate with the polishing composition.

22 Claims, No Drawings

HALIDE ANIONS FOR METAL REMOVAL RATE CONTROL

This application is a continuation-in-part (CIP) application of U.S. application Ser. No. 11/388,085 filed on Mar. 23, 2006, now U.S. Pat. No. 7,820,067.

FIELD OF THE INVENTION

This invention pertains to a polishing composition and a method for polishing a substrate using the same.

BACKGROUND OF THE INVENTION

Compositions, systems, and methods for planarizing or polishing the surface of a substrate, especially for chemical-mechanical polishing (CMP), are well known in the art. Polishing compositions (also known as polishing slurries) typically contain an abrasive material in an aqueous solution and are applied to a surface by contacting the surface with a polishing pad saturated with the polishing composition. When used for polishing substrates comprising metals, the polishing compositions often comprise an oxidizing agent. The purpose of the oxidizing agent is to convert the surface of the metals into a softer, more readily abradable material than the metal itself. Thus, polishing compositions comprising oxidizing agents in conjunction with abrasives generally require less aggressive mechanical abrasion of the substrate, which reduces mechanical damage to the substrate caused by the abrading process. Additionally, the presence of the oxidizing agent frequently increases removal rates for the metals and increases throughput in a production setting.

Development of the next generation of semiconductor devices has emphasized the use of metals with lower resistivity values, such as copper, than previous generation metals such as aluminum in order to reduce capacitance between conductive layers on the devices and to increase the frequency at which a circuit can operate. One way to fabricate planar copper circuit traces on a silicon dioxide substrate is referred to as the damascene process. In accordance with this process, the silicon dioxide dielectric surface is patterned by a conventional dry etch process to form holes and trenches for vertical and horizontal interconnects. The patterned surface is coated with an adhesion-promoting layer such as tantalum or titanium and/or a diffusion barrier layer such as tantalum nitride or titanium nitride. The adhesion-promoting layer and/or the diffusion barrier layer are then over-coated with a copper layer. Chemical-mechanical polishing is employed to reduce the thickness of the copper over-layer, as well as the thickness of any adhesion-promoting layer and/or diffusion barrier layer, until a planar surface that exposes elevated portions of the silicon dioxide surface is obtained. The vias and trenches remain filled with electrically conductive copper forming the circuit interconnects.

The polishing of a substrate containing both tantalum and copper layers typically requires the addition of a traditional copper inhibitor, such as benzotriazole (BTA) or methyl-benzotriazole (m-BTA), to the polishing composition in order to limit the removal rate of the copper layer. The polishing of tantalum layers typically requires an oxidizing agent to achieve useful removal rates, such as a peroxide (e.g., hydrogen peroxide) or potassium iodate. Tantalum layers are typically polished at a high pH. However, the rate of copper removal remains high even for compositions having a low pH and which contain an oxidizer such as hydrogen peroxide or potassium iodate. Further, peroxide is a strong oxidizing agent that can react with other components of polishing compositions, which limits the stability of the polishing compositions and thus their useful pot-life.

Thus, there remains a need for alternative polishing compositions, systems, and methods of polishing for substrates comprising tantalum and copper.

BRIEF SUMMARY OF THE INVENTION

The invention provides a chemical-mechanical polishing composition for polishing a substrate comprising (a) a liquid carrier, (b) an abrasive suspended in the liquid carrier, wherein the abrasive comprises colloidal silica particles, (c) hydrogen peroxide, (d) a halogen anion selected from the group consisting of chloride, bromide, and a combination thereof, and, (e) benzotriazole, wherein the chemical-mechanical polishing composition has a pH of about 6 or less.

The invention also provides a method of chemically-mechanically polishing a substrate. The method comprises (i) contacting a substrate with a chemical-mechanical polishing composition comprising (a) a liquid carrier, (b) an abrasive suspended in the liquid carrier, wherein the abrasive comprises colloidal silica particles, (c) hydrogen peroxide, (d) a halogen anion selected from the group consisting of chloride, bromide, and a combination thereof, and, (e) benzotriazole, wherein the chemical-mechanical polishing composition has a pH of about 6 or less, (ii) moving the polishing composition relative to the substrate, and (iii) abrading at least a portion of the substrate to polish the substrate.

DETAILED DESCRIPTION OF THE INVENTION

The invention provides a chemical-mechanical polishing composition for polishing a substrate. The composition comprises, consists of, or consists essentially of (a) a liquid carrier, (b) an abrasive suspended in the liquid carrier, wherein the abrasive comprises colloidal silica particles, (c) hydrogen peroxide, (d) a halogen anion selected from the group consisting of chloride, bromide, and a combination thereof, and (e) benzotriazole, wherein the chemical-mechanical polishing composition has a pH of about 6 or less. The amounts of components described herein are based on the total weight of the polishing composition unless otherwise specified herein.

The substrate to be polished can be any suitable substrate. Suitable substrates include, but are not limited to, integrated circuits, memory or rigid disks, metals, interlayer dielectric (ILD) devices, semiconductors, micro-electro-mechanical components, ferroelectrics, and magnetic heads. The substrate can comprise a metal layer. The metal layer can comprise any suitable metal. For example, the metal layer can comprise copper, tantalum (e.g., tantalum nitride), titanium, aluminum, nickel, platinum, ruthenium, iridium, or rhodium. The substrate can further comprise at least one other layer, e.g., an insulating layer. The insulating layer can be a metal oxide, porous metal oxide, glass, organic polymer, fluorinated organic polymer, or any other suitable high or low-K insulating layer. The metal layer can be disposed on the other layer. More preferably, the substrate has at least one layer of tantalum and at least one layer of copper.

The abrasive comprises, consists essentially of, or consists of colloidal silica particles. Colloidal silica particles are prepared via a wet process and typically are non-aggregated, individually discrete particles, which generally are spherical or nearly spherical in shape, but can have other shapes (e.g., shapes with generally elliptical, square, or rectangular cross-sections). Such particles typically are structurally different from fumed particles, which are prepared via a pyrogenic or flame hydrolysis process and are chain-like structures of aggregated primary particles.

Preferably, the colloidal silica is precipitated or condensation-polymerized silica, which can be prepared using any method known to those of ordinary skill in the art, such as by the sol gel method or by silicate ion-exchange. Condensation-polymerized silica particles typically are prepared by condensing $Si(OH)_4$ to form substantially spherical particles. The precursor $Si(OH)_4$ can be obtained, for example, by hydrolysis of high purity alkoxysilanes, or by acidification of aqueous silicate solutions. Such abrasive particles can be prepared in accordance with U.S. Pat. No. 5,230,833 or can be obtained as any of various commercially available products such as the BINDZIL 50/80, 30/310, and 40/130 products from EKA Chemicals, the Fuso PL-1, PL-2, PL-3, and PL-3H products, and the Nalco 1034A, 1050, 2327, and 2329 products, as well as other similar products available from DuPont, Bayer, Applied Research, Nissan Chemical (the SNOWTEX products), and Clariant.

The abrasive particles typically have an average particle size (e.g., average particle diameter) of about 20 nm to about 500 nm. Preferably, the abrasive particles have an average particle size of about 20 nm to about 300 nm (e.g., about 70 nm to about 300 nm, or about 100 nm to about 200 nm). Any suitable amount of abrasive can be present in the polishing composition. Typically, about 0.01 wt. % or more (e.g., about 0.05 wt. % or more, about 0.1 wt. % or more, about 0.5 wt. % or more, or about 1 wt. % or more) abrasive will be present in the polishing composition. The amount of abrasive in the polishing composition typically will not exceed about 20 wt. %, more typically will not exceed about 15 wt. % (e.g., will not exceed about 10 wt. %). For example, the amount of abrasive in the polishing composition is about 0.1 wt. % to about 10 wt. %, about 0.5 wt. % to about 8 wt. %, or about 1 wt. % to about 5 wt. %. The particle size for a spherical particle is the diameter of the particle. For a non-spherical particle, the particle size is the diameter of the smallest sphere that encompasses the particle.

A liquid carrier is used to facilitate the application of the abrasive, oxidizing agent, halogen anion, benzotriazole, and any optional additives to the surface of a suitable substrate to be polished (e.g., planarized). The liquid carrier can be any suitable solvent including lower alcohols (e.g., methanol, ethanol, etc.), ethers (e.g., dioxane, tetrahydrofuran, etc.), water, and mixtures thereof. Preferably, the liquid carrier comprises, consists essentially of, or consists of water, more preferably deionized water.

The oxidizing agent is hydrogen peroxide and is present in the polishing composition in any suitable amount. Typically, the polishing composition comprises about 0.1 wt. % or more (e.g., about 0.2 wt. % or more, about 0.5 wt. % or more, about 1 wt. % or more, about 3 wt. % or more, or about 5 wt. % or more) hydrogen peroxide. The polishing composition preferably comprises about 30 wt. % or less (e.g., about 20 wt. % or less, about 10 wt. % or less, about 5 wt. % or less, about 3 wt. % or less, about 1 wt. % or less, or about 0.5 wt. % or less) hydrogen peroxide. For example, the polishing composition comprises about 0.1 wt. % to about 20 wt. %, about 0.2 wt. % to about 10 wt. %, about 0.3 wt. % to about 5 wt. %, about 0.5 wt. % to about 3 wt. %, or about 0.5 wt. % to about 1 wt. % hydrogen peroxide.

The halogen anion can be generated by any source capable of producing a chloride or bromide anion. Preferably, the source is selected from the group consisting of an acid chloride or bromide, an alkali metal chloride or bromide, an alkali earth metal chloride or bromide, a Group IIIA chloride or bromide, an ammonium or ammonium derivative of a chloride or bromide salt, a transition metal chloride or bromide, and combinations thereof. More preferably, the source is selected from the group consisting of hydrogen chloride, magnesium chloride, calcium chloride, strontium chloride, barium chloride, potassium chloride, cesium chloride, lithium chloride, sodium chloride, rubidium chloride, tetrabutyl ammonium chloride, tetramethyl ammonium chloride, tetraethyl ammonium chloride, tetrapropyl ammonium chloride, alkylbenzyldimethylammonium chloride wherein the alkyl is a $C_1$-$C_{20}$ alkyl, aluminum chloride, gallium chloride, indium chloride, thallium chloride, zinc chloride, copper chloride, ferric chloride, ferrous chloride, tetrabutyl ammonium bromide, tetramethyl ammonium bromide, tetraethyl ammonium bromide, tetrapropyl ammonium bromide, alkylbenzyldimethylammonium bromide wherein the alkyl is a $C_1$-$C_{20}$ allyl, hydrogen bromide, cesium bromide, lithium bromide, potassium bromide, rubidium bromide, sodium bromide, magnesium bromide, calcium bromide, strontium bromide, barium bromide, aluminum bromide, gallium bromide, indium bromide, thallium bromide, zinc bromide, copper bromide, ferric bromide, ferrous bromide, and combinations thereof.

The halogen anion can have any suitable concentration in the polishing composition. Typically, the concentration of the halogen anion is about 0.5 mM to about 50 mM (e.g., about 0.1 mM to about 30 mM) in the polishing composition. The concentration of the halogen anion in the polishing composition preferably is about 7 mM or less, and more preferably is about 2 mM or less (e.g., about 1.5 mM or less or about 1 mM or less). The concentration of the halogen anion in the polishing composition preferably is about 0.1 mM or more, and more preferably is about 0.2 mM or more (e.g., about 0.3 mM or more, or about 0.4 mM or more).

Benzotriazole can have any suitable concentration in the polishing composition. Typically, the polishing composition comprises about 10 ppm or more (e.g., about 50 ppm or more, about 100 ppm or more, about 200 ppm or more, about 300 ppm, or more or about 500 ppm or more) benzotriazole. The polishing composition preferably comprises about 2000 ppm or less (e.g., about 1800 ppm or less, about 1500 ppm or less, about 1300 ppm or less, about 1100 ppm or less, about 1000 ppm or less, or about 800 ppm or less) benzotriazole. For example, the polishing composition comprises about 10 ppm to about 2000 ppm, about 50 ppm to about 1500 ppm, about 100 ppm to about 1000 ppm, about 120 ppm to about 1000 ppm, or about 150 ppm to about 800 ppm benzotriazole.

The liquid carrier with any components dissolved or suspended therein can have any suitable pH. The actual pH of the polishing composition will depend, in part, on the type of substrate being polished. The polishing composition has a pH of about 6 or less (e.g., about 5 or less, about 4 or less, about 3 or less, about 2.5 or less, or about 2.2 or less). Typically, the polishing composition has a pH of about 1 or more (e.g., about 1 to about 6, about 1 to about 5, about 1 to about 4, about 1 to about 3, about 1 to about 2.5, or about 1 to about 2.2).

The pH of the polishing composition can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be any suitable acid, such as an inorganic acid, an organic acid, or combination thereof. For example, the acid can be nitric acid. The pH buffering agent can be any suitable buffering agent, for example, phosphates, acetates, borates, sulfonates, carboxylates, ammonium salts, and the like. The polishing composition can comprise any suitable amount of a pH adjustor and/or a pH buffering agent, provided such amount is sufficient to achieve and/or maintain the desired pH of the polishing composition, e.g., within the ranges set forth herein. More preferably, the pH of the polishing composition can be adjusted and/or maintained using the halogen anion source described above.

The polishing composition can comprise, consist essentially of, or consist of the foregoing components, alone or in combination with one or more of the following optional components.

The polishing composition can comprise one or more additional abrasives. Such an additional abrasive can be in any suitable form (e.g., abrasive particles). The additional abrasive desirably is in particulate form and is suspended in the liquid carrier (e.g., water). The additional abrasive can be any suitable abrasive. For example, the additional abrasive can be natural or synthetic, and can comprise, consist essentially of, or consist of metal oxide, carbide, nitride, carborundum, or the like. The additional abrasive also can be a polymer particle or a coated particle. The metal oxide can be selected from the group consisting of alumina, ceria, silica, zirconia, co-formed products thereof, and combinations thereof.

The polishing composition can comprise one or more corrosion inhibitors (i.e., film-forming agents). The corrosion inhibitor can be any suitable corrosion inhibitor. Typically, the corrosion inhibitor is an organic compound containing a heteroatom-containing functional group. For example, the corrosion inhibitor can be a heterocyclic organic compound with at least one 5- or 6-member heterocyclic ring as the active functional group, wherein the heterocyclic ring contains at least one nitrogen atom, for example, an azole compound. The amount of corrosion inhibitor in the polishing composition typically is about 0.0001 wt. % to about 3 wt. % (preferably about 0.001 wt. % to about 2 wt. %).

The polishing composition can comprise one or more chelating or complexing agents. The complexing agent is any suitable chemical additive that enhances the removal rate of the substrate layer being removed. Suitable chelating or complexing agents can include, for example, carbonyl compounds (e.g., acetylacetonates and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), mixtures thereof, and the like), carboxylates containing one or more sulfonic and/or phosphonic groups, and the like. Suitable chelating or complexing agents also can include, for example, di-, tri-, or polyalcohols (e.g., ethylene glycol, pyrocatechol, pyrogallol, tannic acid, and the like) and amine-containing compounds (e.g., ammonia, amino acids, amino alcohols, di-, tri-, and polyamines, and the like). The choice of chelating or complexing agent will depend on the type of substrate layer being removed.

It will be appreciated that many of the aforementioned compounds can exist in the form of a salt (e.g., a metal salt, an ammonium salt, or the like), an acid, or as a partial salt. For example, citrates include citric acid, as well as mono-, di-, and tri-salts thereof; phthalates include phthalic acid, as well as mono-salts (e.g., potassium hydrogen phthalate) and di-salts thereof; perchlorates include the corresponding acid (i.e., perchloric acid), as well as salts thereof. Furthermore, certain compounds or reagents may perform more than one function. For example, some compounds can function both as a chelating agent and an oxidizing agent (e.g., certain ferric nitrates and the like).

The polishing composition optionally further comprises one or more other additives. Such additives include acrylates comprising one or more acrylic subunits (e.g., vinyl acrylates and styrene acrylates), and polymers, copolymers, and oligomers thereof, and salts thereof.

The polishing composition can comprise one or more surfactants and/or rheological control agents, including viscosity enhancing agents and coagulants (e.g., polymeric rheological control agents, such as, for example, urethane polymers). Suitable surfactants can include, for example, cationic surfactants, anionic surfactants, nonionic surfactants, amphoteric surfactants, mixtures thereof, and the like. Preferably, the polishing composition comprises a nonionic surfactant. One example of a suitable nonionic surfactant is an ethylenediamine polyoxyethylene surfactant. The amount of surfactant in the polishing composition typically is about 0.0001 wt. % to about 1 wt. % (preferably about 0.001 wt. % to about 0.1 wt. % and more preferably about 0.005 wt. % to about 0.05 wt. %).

The polishing composition can comprise one or more antifoaming agents. The antifoaming agent can be any suitable anti-foaming agent. Suitable antifoaming agents include, but are not limited to, silicon-based and acetylenic diol-based antifoaming agents. The amount of anti-foaming agent in the polishing composition typically is about 10 ppm to about 140 ppm.

The polishing composition can comprise one or more biocides. The biocide can be any suitable biocide, for example an isothiazolinone biocide. The amount of biocide in the polishing composition typically is about 1 to about 50 ppm, preferably about 10 to about 20 ppm.

The polishing composition preferably is colloidally stable. The term colloid refers to the suspension of the particles in the liquid carrier. Colloidal stability refers to the maintenance of that suspension through time. A polishing composition is considered colloidally stable if, when the polishing composition is placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the polishing composition ([C] in terms of g/ml) is less than or equal to 0.5 (i.e., $\{[B]-[T]\}/[C] \leq 0.5$). Preferably, the value of $[B]-[T]/[C]$ is less than or equal to 0.3, more preferably is less than or equal to 0.1, even more preferably is less than or equal to 0.05, and most preferably is less than or equal to 0.01.

The polishing composition can be prepared by any suitable technique, many of which are known to those skilled in the art. The polishing composition can be prepared in a batch or continuous process. Generally, the polishing composition can be prepared by combining the components thereof in any order. The term "component" as used herein includes individual ingredients (e.g., oxidizing agent, abrasive, etc.) as well as any combination of ingredients (e.g., liquid carrier, halogen anion, surfactants, etc.).

The polishing composition can be supplied as a one-package system comprising an oxidizing agent, a halogen anion, a liquid carrier, and optionally an abrasive. Alternatively, the oxidizing agent can be supplied in a first container, either in dry form, or as a solution or dispersion in the liquid carrier, and the halogen anion, the liquid carrier, and optionally the abrasive and other additives, can be supplied in a second container. The use of a stable oxidizing agent allows the oxidizing agent to be supplied in a container with other components of the polishing composition, since it is less likely to react with the other components. This approach can substantially reduce the cost of preparing and using the polishing composition.

Optional components, such as one or more chelating or complexing agents, can be placed in the first and/or second containers or in a third container, either in dry form, or as a solution in the liquid carrier. Moreover, it is suitable for the components in the first and second containers to have different pH values, or alternatively to have substantially similar, or even equal, pH values. If an optional component is a solid, it may be supplied either in dry form or as a mixture in the liquid carrier. The optional components can be supplied separately from the other components of the polishing system and can be combined, e.g., by the end-user, with the other components of the polishing composition shortly before use (e.g., 1 week or less prior to use, 1 day or less prior to use, 1 hour or less prior to use, 10 minutes or less prior to use, or 1 minute or less prior to use). Other two-container, or three or more container combinations of the components of the polishing composition are within the knowledge of one of ordinary skill in the art.

The polishing composition also can be provided as a concentrate which is intended to be diluted with an appropriate amount of liquid carrier prior to use. In such an embodiment, the polishing composition concentrate can comprise abrasive, hydrogen peroxide, halogen anion, and liquid carrier in amounts such that, upon dilution of the concentrate with an appropriate amount of liquid carrier, each component will be present in the polishing composition in an amount within the appropriate range recited above for each component. For example, components can each be present in the concentrate in an amount that is about 2 times (e.g., about 3 times, about 4 times, or about 5 times) greater than the concentration recited above for each component in the polishing composition so that, when the concentrate is diluted with an appropriate volume of liquid carrier (e.g., 2 equal volumes of liquid carrier, 3 equal volumes of liquid carrier, or 4 equal volumes of liquid carrier, respectively), each component will be present in the polishing composition in an amount within the ranges set forth above for each component. Furthermore, as will be understood by those of ordinary skill in the art, the concentrate can contain an appropriate fraction of the liquid carrier present in the final polishing composition in order to ensure that the abrasive, hydrogen peroxide, halogen anion, and other suitable additives are at least partially or fully dissolved or suspended in the concentrate. Moreover, the hydrogen peroxide can be left out of the concentrate to be later added in an appropriate amount with liquid carrier to form the polishing composition such that each component is present in an amount within the ranges set forth above for each component.

The invention also provides a method of chemically-mechanically polishing a substrate. The method comprises (i) contacting a substrate with a chemical-mechanical polishing composition as described herein, (ii) moving the chemical-mechanical polishing composition relative to the substrate, and (iii) abrading at least a portion of the substrate to polish the substrate.

The inventive method of polishing a substrate is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the chemical-mechanical polishing composition of the invention, with the polishing pad moving relative to the substrate, so as to abrade at least a portion of the substrate to polish the substrate.

The polishing pad can be any suitable polishing pad, many of which are known in the art. Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

The polishing pad can comprise fixed abrasive particles on or within the polishing surface of the polishing pad, or the polishing pad can be substantially free of fixed abrasive particles. Fixed abrasive polishing pads include pads having abrasive particles affixed to the polishing surface of the polishing pad by way of an adhesive, binder, ceramer, resin, or the like or abrasives that have been impregnated within a polishing pad so as to form an integral part of the polishing pad, such as, for example, a fibrous batt impregnated with an abrasive-containing polyurethane dispersion.

The polishing pad can have any suitable configuration. For example, the polishing pad can be circular and, when in use, typically will have a rotational motion about an axis perpendicular to the plane defined by the surface of the pad. The polishing pad can be cylindrical, the surface of which acts as the polishing surface, and, when in use, typically will have a rotational motion about the central axis of the cylinder. The polishing pad can be in the form of an endless belt, which when in use typically will have a linear motion with respect to the cutting edge being polished. The polishing pad can have any suitable shape and, when in use, have a reciprocating or orbital motion along a plane or a semicircle. Many other variations will be readily apparent to the skilled artisan.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643.

Polishing refers to the removal of at least a portion of a surface to polish the surface. Polishing can be performed to provide a surface having reduced surface roughness by removing gouges, crates, pits, and the like, but polishing also can be performed to introduce or restore a surface geometry characterized by an intersection of planar segments. For example, where two surfaces intersect to define an edge, polishing of at least one of the surfaces by abrading at least a portion of the surface results in an alteration of the geometry of the edge. In embodiments wherein the one or more surfaces define an edge that is used in a cutting operation (e.g., in polishing of cutting tools), polishing of the surface can result in a redefinition or resharpening of the edge.

As previously discussed, the substrate preferably has at least one layer of tantalum and at least one layer of copper. A portion of the tantalum layer and/or a portion of the copper layer is abraded to polish the substrate. The tantalum layer desirably is removed from the substrate at a rate of about 100

Å/min or more (e.g., about 200 Å/min or more, about 300 Å/min or more, about 400 Å/min or more, or about 500 Å/min or more). For example, the tantalum layer is removed from the substrate at a rate of about 100 Å/min to about 1000 Å/min, about 200 Å/min to about 800 Å/min, about 200 Å/min to about 700 Å/min, or about 200 Å/min to about 500 Å/min. The copper layer desirably is removed from the substrate at a rate of about 1500 Å/min or less (e.g., about 1000 Å/min or less, about 800 Å/min or less, about 500 Å/min or less, or about 300 Å/min or less). Unexpectedly, the presence of halogen anions, such as chloride or bromide, in combination with BTA and hydrogen peroxide, effectively reduces the rate of copper removal without substantially reducing the rate of tantalum removal, which allows polishing of the substrate to occur in a single, rather than a multi-step, process. This is a significant improvement over the use of traditional copper inhibitors alone, such as BTA and m-BTA, which are relatively ineffective in reducing the rate of copper removal and can be easily degraded by other components of the polishing composition, such as hydrogen peroxide. Additionally, although the use of chloride or bromide ions alone can decrease the copper removal rate, the addition of BTA combined with the other components of the polishing composition described herein results in a much more significant decrease in copper removal rates. Without wishing to be bound by any particular theory, it is possible that the low solubility of CuCl or CuBr leads to preferential adsorption of the chloride or bromide anions on $Cu^+$ sites, thereby preventing continuous copper oxidation by the oxidizing agent.

The following examples further illustrate the invention but, of course, should not be construed as in any way limiting its scope.

EXAMPLE 1

This example illustrates the effect on the removal rate of copper by the presence of various types of anions and BTA in a polishing composition containing colloidal silica particles and hydrogen peroxide.

Six different polishing compositions were evaluated with respect to copper removal rate. Each composition comprised water, 5 wt. % colloidal silica (20 nm diameter Fuso PL-2), and 1 wt. % $H_2O_2$. The pH of each composition was adjusted to a pH of 2 with sulfuric acid (compositions 1A, 1C, and 1D), hydrochloric acid (compositions 1B and 1E), or perchloric acid (composition 1F). In addition, compositions 1D-1F comprised 300 ppm BTA.

A substrate containing a layer of copper was polished with each of the compositions using a Logitech polisher with a hard A110 pad (Cabot Microelectronics). The Logitech polisher was set with a 21.4 kPa (3.1 psi) down force, a platen speed of 110 rpm, a carrier speed of 102 rpm, and a composition flow rate of 150 ml/min.

The copper removal rate (Å/min) was determined for each composition, and the results are shown in Table 1.

TABLE 1

Copper Removal Rates (Å/min)

| Polishing Composition | Anion Source | BTA (ppm) | Copper Removal Rate (Å/min) |
|---|---|---|---|
| 1A (comparative) | $H_2SO_4$ | 0 | 4894 |
| 1B (comparative) | HCl | 0 | 4185 |
| 1C (comparative) | $HClO_4$ | 0 | 4282 |
| 1D (comparative) | $H_2SO_4$ | 300 | 4780 |
| 1E (inventive) | HCl | 300 | 263 |
| 1F (comparative) | $HClO_4$ | 300 | 1634 |

As is apparent from the data set forth in Table 1, compositions 1A-1D had high copper removal rates. In particular, the comparative compositions containing chlorine-based ions without BTA and sulfate ions with or without BTA exhibited higher copper removal rates than the inventive compositions containing chlorine-based ions and BTA. Indeed, the inventive compositions containing chloride ions and BTA (compositions 1E and 1F) exhibited a rate of copper removal that was approximately twenty times lower than the rate of the comparative compositions. The source of the chlorine-based ions also had an impact on the copper removal rate. When the ion source was HCl, the copper removal rate was over six times lower than when the ion source was $HClO_4$.

EXAMPLE 2

This example illustrates the effect on the removal rate of copper by the presence of varying amounts of chloride anions in a polishing composition containing silica, hydrogen peroxide, and BTA.

Eight different polishing compositions were evaluated with respect to copper removal rate. Each composition comprised water, 5 wt. % colloidal silica (20 nm diameter Fuso PL-2), 300 ppm BTA, and 1 wt. % $H_2O_2$. The pH of compositions 2A-2D was adjusted to a pH of 2 with sulfuric acid, and the pH of compositions 2E-2H was adjusted to a pH of 2 with perchloric acid. In addition, compositions 2B-2D and 2F-2H contained the amount of KCl indicated in Table 2.

A substrate containing a layer of copper was polished with each of the compositions using a Logitech polisher with a hard A110 pad (Cabot Microelectronics). The Logitech polisher was set with a 21.4 kPa (3.1 psi) down force, a platen speed of 110 rpm, a carrier speed of 102 rpm, and a composition flow rate of 150 ml/min.

The copper removal rate (Å/min) was determined for each composition, and the results are shown in Table 2.

TABLE 2

Copper Removal Rates (Å/min)

| Polishing Composition | Source of Anions Used to Adjust pH | KCl (mM) | Copper Removal Rate (Å/min) |
|---|---|---|---|
| 2A (comparative) | $H_2SO_4$ | 0 | 4780 |
| 2B (inventive) | $H_2SO_4$ | 0.1 | 411 |
| 2C (inventive) | $H_2SO_4$ | 1 | 306 |
| 2D (inventive) | $H_2SO_4$ | 10 | 279 |
| 2E (comparative) | $HClO_4$ | 0 | 1634 |
| 2F (inventive) | $HClO_4$ | 0.1 | 358 |
| 2G (inventive) | $HClO_4$ | 1 | 317 |
| 2H (inventive) | $HClO_4$ | 10 | 285 |

As is apparent from the data set forth in Table 2, composition 2A, which did not contain any chloride ions, had a high copper removal rate when compared with compositions 2B-2H. The inventive compositions containing KCl (compositions 2B-2D and 2F-2H) exhibited a rate of copper removal that was significantly lower than the rates of comparative composition 2A, which contained $H_2SO_4$ but not KCl, and comparative composition 2E, which contained $HClO_4$ but not KCl. Thus, the combination of a chloride ion with BTA results in a lower copper removal rate when compared with sulfate ions with BTA or perchlorate ions with BTA.

EXAMPLE 3

This example illustrates the effect on the removal rate of copper by the presence of varying amounts of chloride or bromide anions and BTA in a polishing composition containing silica and hydrogen peroxide.

Thirty-two different polishing compositions were evaluated with respect to copper removal rate. Each composition comprised water, 5 wt. % colloidal silica (20 nm diameter Fuso PL-2), and 1 wt. % $H_2O_2$, and was adjusted to a pH of 2 with $H_2SO_4$. In addition, the compositions contained the amounts of BTA, KBr, and KCl indicated in Table 3.

A substrate containing a layer of copper was polished with each of the compositions using a Logitech polisher with a hard A110 pad (Cabot Microelectronics). The Logitech polisher was set with a 9.93 kPa (1.44 psi) down force, a platen speed of 90 rpm, a carrier speed of 84 rpm, and a composition flow rate of 80 ml/min.

The copper removal rate (Å/min) was determined for each composition, and the results are shown in Table 3.

TABLE 3

Copper Removal Rates (Å/min)

| Polishing Composition | KCl (mM) | KBr (mM) | BTA (ppm) | Copper Removal Rate (Å/min) |
|---|---|---|---|---|
| 3A (comparative) | 0 | 0 | 300 | 1109 |
| 3B (inventive) | 0 | 0.1 | 300 | 421 |
| 3C (inventive) | 0 | 1 | 300 | 343 |
| 3D (inventive) | 0 | 10 | 300 | 157 |
| 3E (comparative) | 0 | 0 | 0 | 4183 |
| 3F (comparative) | 0.1 | 0 | 0 | 4671 |
| 3G (comparative) | 1 | 0 | 0 | 1937 |
| 3H (comparative) | 10 | 0 | 0 | 1327 |
| 3I (comparative) | 0 | 0 | 100 | 2910 |
| 3J (inventive) | 0.1 | 0 | 100 | 1290 |
| 3K (inventive) | 1 | 0 | 100 | 454 |
| 3L (inventive) | 10 | 0 | 100 | 426 |
| 3M (comparative) | 0 | 0 | 200 | 2359 |
| 3N (inventive) | 0.1 | 0 | 200 | 582 |
| 3O (inventive) | 1 | 0 | 200 | 421 |
| 3P (inventive) | 10 | 0 | 200 | 256 |
| 3Q (comparative) | 0 | 0 | 300 | 1109 |
| 3R (inventive) | 0.1 | 0 | 300 | 264 |
| 3S (inventive) | 1 | 0 | 300 | 306 |
| 3T (inventive) | 10 | 0 | 300 | 289 |
| 3U (comparative) | 0 | 0 | 400 | 1236 |
| 3V (inventive) | 0.1 | 0 | 400 | 958 |
| 3W (inventive) | 1 | 0 | 400 | 987 |
| 3X (inventive) | 10 | 0 | 400 | 800 |
| 3Y (comparative) | 0 | 0 | 500 | 774 |
| 3Z (inventive) | 0.1 | 0 | 500 | 408 |
| 3AA (inventive) | 1 | 0 | 500 | 420 |
| 3BB (inventive) | 10 | 0 | 500 | 492 |
| 3CC (comparative) | 0 | 0 | 1000 | 505 |
| 3DD (inventive) | 0.1 | 0 | 1000 | 342 |
| 3EE (inventive) | 1 | 0 | 1000 | 310 |
| 3FF (inventive) | 10 | 0 | 1000 | 270 |

As is apparent from the data set forth in Table 3, compositions containing bromide ions, as well as compositions containing chloride ions, exhibited a reduction in the copper removal rate that was further enhanced by the addition of BTA to the polishing composition. In addition, even as the amount of BTA was increased to 1000 ppm, which alone significantly reduced the copper removal rate, the addition of chloride anions to the polishing composition still resulted in a further decrease in the copper removal rate.

EXAMPLE 4

This example illustrates the effect on the removal rate of copper by the presence of various types of anions in a polishing composition containing silica and either hydrogen peroxide or potassium iodate.

Ten different polishing compositions (compositions 4A-4J) were evaluated with respect to copper removal rate. Compositions 4A-4J comprised water, 5 wt. % colloidal silica (20 nm diameter Fuso PL-2), and 0.2 wt. % $KIO_3$, and the pH of each composition was adjusted to 2 using the source of anions indicated in Table 4. In addition, compositions 4B, 4D, 4F, 4H, and 4J contained 300 ppm BTA.

A substrate containing a layer of copper was polished with each of compositions 4A-4J using a Logitech polisher with a hard A110 pad (Cabot Microelectronics). The Logitech polisher was set with a 21.4 kPa (3.1 psi) down force, a platen speed of 110 rpm, a carrier speed of 102 rpm, and a composition flow rate of 150 ml/min.

The copper removal rate (Å/min) was determined for compositions 4A-4J, and the results are shown in Table 4.

In addition, the copper removal rates (Å/min) for polishing compositions 1A-1F, which were determined as described in Example 1, and polishing composition 3C, which was determined as described in Example 3, are included in Table 4 for comparative purposes. It should be noted that the settings of the Logitech polisher used in Example 3 differ from those used in Examples 1 and 4.

TABLE 4

Copper Removal Rates (Å/min)

| Polishing Composition | Source of Anions | Oxidizer | BTA (ppm) | Copper Removal Rate (Å/min) |
|---|---|---|---|---|
| 1A (comparative) | $H_2SO_4$ | $H_2O_2$ | 0 | 4894 |
| 1D (comparative) | $H_2SO_4$ | $H_2O_2$ | 300 | 4780 |
| 4A (comparative) | $H_2SO_4$ | $KIO_3$ | 0 | 5461 |
| 4B (comparative) | $H_2SO_4$ | $KIO_3$ | 300 | 7308 |
| 1C (comparative) | $HClO_4$ | $H_2O_2$ | 0 | 4282 |
| 1F (comparative) | $HClO_4$ | $H_2O_2$ | 300 | 1634 |
| 4C (comparative) | $HClO_4$ | $KIO_3$ | 0 | 4045 |
| 4D (comparative) | $HClO_4$ | $KIO_3$ | 300 | 7405 |
| 4E (comparative) | $H_3PO_4$ | $KIO_3$ | 0 | 7811 |
| 4F (comparative) | $H_3PO_4$ | $KIO_3$ | 300 | 6012 |
| 1B (comparative) | HCl | $H_2O_2$ | 0 | 4185 |
| 1E (inventive) | HCl | $H_2O_2$ | 300 | 263 |
| 4G (comparative) | HCl | $KIO_3$ | 0 | 1002 |
| 4H (comparative) | HCl | $KIO_3$ | 300 | 1593 |
| 3C (inventive) | HBr | $H_2O_2$ | 300 | 343 |
| 4I (comparative) | HBr | $KIO_3$ | 0 | 1641 |
| 4J (comparative) | HBr | $KIO_3$ | 300 | 1378 |

As is apparent from the data set forth in Table 4, compositions 1E and 3C, which contained hydrogen peroxide, BTA, and either chloride or bromide anions, had relatively low copper removal rates when compared with the remaining compositions, including compositions 4H and 4J, which contained potassium iodate, BTA, and either chloride or bromide anions. Thus, the addition of BTA to compositions containing either chloride or bromide anions and potassium iodate appeared to have little effect on the copper polishing rate (BTA actually increased the rate in composition 4H, which contained chloride anions), whereas the addition of BTA to compositions containing either chloride or bromide anions and hydrogen peroxide significantly reduced the copper polishing rate. When the source of anions was $H_2SO_4$, $HClO_4$, or $H_3PO_4$, the use of potassium iodate as an oxidizer in compositions with or without BTA did not significantly reduce the copper polishing rate (see compositions 4A-4F). Similar results were observed when using the same ion sources in compositions containing hydrogen peroxide (see compositions 1A, 1D, 1C, and 1F from Example 1). The results of this example suggest that the presence and type of oxidizing agent used in the polishing composition plays a role in the ability of BTA combined with chloride or bromide ions to lower the copper removal rate.

EXAMPLE 5

This example illustrates the effect on the removal rate of copper by the presence of varying amounts of chloride and BTA in a polishing composition containing silica, hydrogen peroxide and a copper complexing agent [1-hydroxy ethylidene-1,1-diphosphonic acid (Dequest 2010 by ClearTech Industries Inc.)].

Four different polishing compositions were evaluated with respect to copper removal rate. Each composition comprised water, 1 wt. % colloidal silica (20 nm diameter Fuso PL-2) treated with bis(trimethoxysilylpropyl)amine, 150 ppm Dequest 2010, 1500 ppm BTA, and 1 wt. % $H_2O_2$, and had a pH of 4.1. In addition, the compositions contained the amounts of KCl indicated in Table 5.

A substrate containing a layer of copper was polished with each of the compositions using a Logitech polisher with a soft POLITEX™ pad. The Logitech polisher was set with a 9.93 kPa (1.44 psi) down force, a platen speed of 90 rpm, a carrier speed of 84 rpm, and a composition flow rate of 80 ml/min.

The copper removal rate (Å/min) was determined for each composition, and the results are shown in Table 5.

TABLE 5

Copper Removal Rates (Å/min)

| Polishing Composition | KCl (ppm) | BTA (ppm) | Copper Removal Rate (Å/min) |
|---|---|---|---|
| 5A (comparative) | 0 | 1500 | 924 |
| 5B (invention) | 10 | 1500 | 561 |
| 5C (invention) | 30 | 1500 | 400 |
| 5D (invention) | 100 | 1500 | 264 |

As is apparent from the data set forth in Table 5, the copper removal rate decreased significantly as the concentration of KCl in the polishing compositions was increased. Thus, chloride anions maintain the ability to effectively reduce the rate of copper removal, even at higher pH levels.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A chemical-mechanical polishing composition for polishing a substrate comprising:
   (a) a liquid carrier,
   (b) an abrasive suspended in the liquid carrier, wherein the abrasive comprises condensation-polymerized silica particles,
   (c) hydrogen peroxide,
   (d) hydrogen chloride or hydrogen bromide, an alkali metal chloride or bromide, an alkali earth metal chloride or bromide, a Group IIIA chloride or bromide, a transition metal chloride or bromide, or a combination thereof in an amount sufficient to provide about 0.1 mM to about 30 mM of chloride or bromide anion, and
   (e) benzotriazole,
   wherein the chemical-mechanical polishing composition has a pH of about 1 to about 2.5.

2. The polishing composition of claim 1, wherein the liquid carrier comprises water.

3. The polishing composition of claim 1, wherein the condensation-polymerized silica is present in an amount of about 0.1 wt. % to about 10 wt. %.

4. The polishing composition of claim 1, wherein the hydrogen peroxide is present in an amount of about 3 wt. % or less.

5. The polishing composition of claim 1, wherein the polishing composition comprises a compound selected from the group consisting of hydrogen chloride, magnesium chloride, calcium chloride, strontium chloride, barium chloride, potassium chloride, cesium chloride, lithium chloride, sodium chloride, rubidium chloride, aluminum chloride, gallium chloride, indium chloride, thallium chloride, zinc chloride, copper chloride, ferric chloride, ferrous chloride, hydrogen bromide, lithium bromide, potassium bromide, cesium bromide, rubidium bromide, sodium bromide, magnesium bromide, calcium bromide, strontium bromide, barium bromide, aluminum bromide, gallium bromide, indium bromide, thallium bromide, zinc bromide, copper bromide, ferric bromide, ferrous bromide, and combinations thereof.

6. The polishing composition of claim 1, wherein the concentration of benzotriazole is about 100 ppm to about 2000 ppm.

7. The composition of claim 1, wherein the substrate comprises a copper layer and wherein the composition reduces the removal rate of the copper layer as compared to the same composition without the chloride or bromide anion.

8. A method of chemically-mechanically polishing a substrate, which method comprises:
   (i) contacting a substrate with a chemical-mechanical polishing composition comprising:
      (a) a liquid carrier,
      (b) an abrasive suspended in the liquid carrier, wherein the abrasive comprises condensation-polymerized silica particles,
      (c) hydrogen peroxide,
      (d) hydrogen chloride or hydrogen bromide, an alkali metal chloride or bromide, an alkali earth metal chloride or bromide, a Group IIIA chloride or bromide, a transition metal chloride or bromide, or a combination thereof in an amount sufficient to provide about 0.1 mM to about 30 mM of chloride or bromide anion, and
      (e) benzotriazole,
   wherein the chemical-mechanical polishing composition has a pH of about 1 to about 2.5,
   (ii) moving the chemical-mechanical polishing composition relative to the substrate, and
   (iii) abrading at least a portion of the substrate to polish the substrate.

9. The method of claim 8, wherein the liquid carrier comprises water.

10. The method of claim 8, wherein the condensation-polymerized silica is present in an amount of about 0.1 wt. % to about 10 wt. %.

11. The method of claim 8, wherein the hydrogen peroxide is present in an amount of about 3 wt. % or less.

12. The method of claim 8, wherein the polishing composition comprises a compound selected from the group consisting of hydrogen chloride, magnesium chloride, calcium chloride, strontium chloride, barium chloride, potassium chloride, cesium chloride, lithium chloride, sodium chloride, rubidium chloride, aluminum chloride, gallium chloride, indium chloride, thallium chloride, zinc chloride, copper chloride, ferric chloride, ferrous chloride, hydrogen bromide, lithium bromide, potassium bromide, cesium bromide, rubidium bromide, sodium bromide, magnesium bromide, calcium bromide, strontium bromide, barium bromide, aluminum bromide, gallium bromide, indium bromide, thallium bromide, zinc bromide, copper bromide, ferric bromide, ferrous bromide, and combinations thereof.

13. The method of claim 8, wherein the concentration of benzotriazole is about 100 ppm to about 2000 ppm.

14. The method of claim 8, wherein the substrate comprises at least one layer of tantalum and at least one layer of copper, and a portion of the tantalum and a portion of the copper are abraded to polish the substrate.

15. The method of claim 14, wherein the copper layer is removed from the substrate at a rate of about 1000 Å/min or less.

16. The method of claim 14, wherein the copper layer is removed from the substrate at a rate of about 800 Å/min or less.

17. The method of claim 14, wherein the copper layer is removed from the substrate at a rate of about 500 Å/min or less.

18. The method of claim 14, wherein the copper layer is removed from the substrate at a rate of about 300 Å/min or less.

19. The method of claim 14, wherein the tantalum layer is removed from the substrate at a rate of about 100 Å/min or more.

20. The method of claim 14, wherein the tantalum layer is removed from the substrate at a rate of about 200 Å/min or more.

21. The method of claim 8, wherein the method further comprises contacting the substrate with a polishing pad and moving the polishing pad relative to the substrate.

22. The method of claim 8, wherein the substrate comprises a copper layer and wherein the method reduces the removal rate of the copper layer as compared to the same method without the chloride or bromide anion.

* * * * *